(12) United States Patent
Chang et al.

(10) Patent No.: US 12,143,984 B2
(45) Date of Patent: Nov. 12, 2024

(54) USER EQUIPMENT AND METHOD EXECUTED BY USER EQUIPMENT

(71) Applicant: SHARP KABUSHIKI KAISHA, Osaka (JP)

(72) Inventors: Ningjuan Chang, Shanghai (CN); Renmao Liu, Shanghai (CN)

(73) Assignee: SHARP KABUSHIKI KAISHA, Osaka (JP)

( * ) Notice: Subject to any disclaimer, the term of this patent is extended or adjusted under 35 U.S.C. 154(b) by 721 days.

(21) Appl. No.: 17/288,882

(22) PCT Filed: Oct. 30, 2019

(86) PCT No.: PCT/CN2019/114314
§ 371 (c)(1),
(2) Date: Apr. 26, 2021

(87) PCT Pub. No.: WO2020/088512
PCT Pub. Date: May 7, 2020

(65) Prior Publication Data
US 2022/0007392 A1    Jan. 6, 2022

(30) Foreign Application Priority Data
Nov. 1, 2018    (CN) .......................... 201811297892.0

(51) Int. Cl.
*H04W 72/1268*    (2023.01)
*H04W 52/02*    (2009.01)
(Continued)

(52) U.S. Cl.
CPC ... *H04W 72/1268* (2013.01); *H04W 52/0216* (2013.01); *H04W 52/0219* (2013.01);
(Continued)

(58) Field of Classification Search
CPC .. H04W 72/0453; H04W 72/21; H04W 76/27
See application file for complete search history.

(56) References Cited

U.S. PATENT DOCUMENTS

2008/0285566 A1*   11/2008   Sammour ............... H04L 1/188
                                                    370/394
2013/0003700 A1*    1/2013   Zhang ................... H04W 76/19
                                                    370/328

(Continued)

OTHER PUBLICATIONS

Ericsson, "Rel-14 dedicated carrier configuration", 8.11.3 Non-anchor PRB enhancements, Tdoc R2-1700770, 3GPP TSG-RAN WG2 #97, Athens, Greece, Feb. 13-17, 2017.

(Continued)

*Primary Examiner* — Yee F Lam
(74) *Attorney, Agent, or Firm* — ScienBiziP, P.C.

(57) ABSTRACT

Provided in the present disclosure are a method executed by user equipment and user equipment, comprising: receiving an RRC message containing a pre-configured uplink resource configuration, the RRC message comprising a message related to an RRC connection configured by a base station, and the user equipment determining, according to carrier information in the pre-configured uplink resource configuration, whether the pre-configured uplink resource configuration is related to an anchor carrier or a non-anchor carrier.

2 Claims, 3 Drawing Sheets

(51) Int. Cl.
  *H04W 72/0453* (2023.01)
  *H04W 72/23* (2023.01)
  *H04W 76/28* (2018.01)

(52) U.S. Cl.
  CPC ..... *H04W 52/0229* (2013.01); *H04W 52/028* (2013.01); *H04W 72/0453* (2013.01); *H04W 72/23* (2023.01); *H04W 76/28* (2018.02)

(56) References Cited

U.S. PATENT DOCUMENTS

| | | | | |
|---|---|---|---|---|
| 2015/0358954 | A1* | 12/2015 | Koshimizu | H04W 76/27 370/329 |
| 2018/0049254 | A1* | 2/2018 | Xu | H04W 48/00 |
| 2018/0234894 | A1* | 8/2018 | Jiang | H04W 60/06 |
| 2018/0302914 | A1* | 10/2018 | da Silva | H04W 76/27 |

OTHER PUBLICATIONS

Ericsson, "Revised WID: Additional MTC enhancements for LTE", 10.7.1, RP-181878, 3GPP TSG RAN Meeting #81, Gold Coast, Australia, Sep. 10-13, 2018.

Ericsson, Huawei, "New WID on Rel-16 enhancements for NB-IoT", 10.1.3, RP-181451, 3GPP TSG RAN Meeting #80, La Jolla, USA, Jun. 11-14, 2018.

Huawei, Hisilicon, "Feature lead summary of Support for transmission in preconfigured UL resources", R1-1811697 3GPP TSG RAN WG1 Meeting #94b, Chengdu, China, Oct. 8-12, 2018.

Mediatek Inc., "Early transmission in preconfigured UL resources in NB-IoT Document for: Discussion and Decision", R1-1810607 3GPP TSG RAN WG1 Meeting #94bis, Chengdu, China, Oct. 8-12, 2018.

* cited by examiner

USER EQUIPMENT AND METHOD EXECUTED BY USER EQUIPMENT

TECHNICAL FIELD

The present disclosure relates to the technical field of wireless communications. More specifically, the present disclosure relates to user equipment and a method executed by user equipment.

BACKGROUND

In June 2018, a new work item on Release 16 of the further enhancement for the NarrowBand Internet of Things (NB-IoT) Project (see RP-181451: New WID on R16 enhancement for NB-IoT) and a new work item on Release 16 of the further enhancement for Machine Type Communication (MTC) (see RP-181878, Revised WID for additional MTC enhancement) were approved at the 3rd Generation Partnership Project (3GPP) RAN#80 plenary meeting. One of the goals of this research project is to improve the efficiency of uplink transmission to reduce the power consumption of User Equipment (UE).

In the prior art, if UE in an idle state intends to transmit uplink data, there are two modes: one mode is to enter an RRC connected state through Radio Resource Control (RRC) connection establishment/recovery procedure, i.e., transmits the uplink data in the RRC connected state in which connection is established with a network side; the other mode is to employ an Early Data Transmission (EDT) mechanism introduced in Release 15, i.e., transmits small data packets to a base station together in a third message in a random access procedure. For small data packets, using the EDT mode can obviously reduce signaling overheads and consume less UE power than entering the RRC connected state first and then transmitting uplink data. In the aforementioned Release 16, it is desired to further improve the efficiency of uplink transmission and reduce UE power consumption. In the ongoing technical discussion of improving uplink transmission efficiency to reduce UE power consumption, a feasible method is to pre-allocate available uplink resources for a user in an RRC idle state. When uplink data arrives at the UE, if an uplink of the UE is still in a synchronized state (that is, there is a valid uplink Time Advance (TA)), uplink transmission can be completed using the pre-allocated uplink resources without requiring to perform uplink transmission through a random access procedure or by entering a connected state through an RRC connection establishment/recovery procedure.

In the present disclosure, the manner in which the UE in an RRC idle state transmits uplink data by using pre-configured resources is called pre-configured uplink resource transmission. The solution proposed in the present disclosure is mainly to address the issue of how to transmit pre-configured uplink resources, and more specifically, to address the issue of configuration and management of pre-configured uplink resources.

In addition, in the 3GPP Rel-14 standard specification, for UE in an idle mode, a paging mechanism can be employed to reduce the power consumption of the UE. However, when the UE is in a poor channel state and requires coverage enhancement, a PDCCH and/or PDSCH needs to be repeatedly transmitted so as to correctly receive information from a base station or correctly transmit information to a base station. When the UE needs to detect a paging message, the UE needs to be woken up from a sleep state to detect on each PO whether a paging message of the UE exists. However, the UE does not have any paging message most of the time. In this way, when the UE is in a coverage enhanced state, the UE needs to receive a PDCCH or PDSCH repeatedly many times so as to detect whether a paging message of the UE exists, and the UE does not have its own paging message most of the time. As a result, the UE power is greatly consumed. For an MTC or NB-IoT user, it is extremely important to reduce power consumption of the UE. Therefore, in the 3GPP Rel-15 standard specification, physical wake-up signaling is introduced for the UE in an idle state. That is, before detection of a paging message on each PO, physical wake-up signaling is designed. If the UE detects the physical wake-up signaling, the UE detects a paging message on a subsequent PO; if the UE does not detect the physical wake-up signaling, the UE does not detect the paging message on the subsequent PO and directly returns to a sleep state. In the aforementioned new work item of Rel-16, one of goals of the work item is to introduce UE-group-based wake-up signaling (UE-group WUS) or physical go-to-sleep signaling to further reduce power consumption of UE. In the UE-group-based WUS, the UE can only monitor WUS corresponding to a group associated with the UE. A solution to the issue of how to configure and use the UE-group-based WUS is proposed in the present disclosure.

SUMMARY

In order to address at least a part of the above-mentioned issues, the present invention provides a method executed by user equipment and user equipment, which are capable of resolving the issue of configuration and management of pre-configured uplink resources.

According to a first aspect of the embodiments of the present disclosure, provided is a method executed by user equipment, including: receiving an RRC message containing a pre-configured uplink resource configuration, the RRC message including a message related to an RRC connection configured by a base station, and the user equipment determining, according to carrier information in the pre-configured uplink resource configuration, whether the pre-configured uplink resource configuration is related to an anchor carrier or a non-anchor carrier.

According to the method of the first aspect of the embodiments of the present disclosure, the determining according to carrier information in the pre-configured uplink resource configuration includes: determining according to presence or absence of the carrier information; or determining according to a value of the carrier information; or determining according to a carrier index contained in the carrier information.

The method according to the first aspect of the embodiments of the present disclosure further includes: storing the received pre-configured uplink resource configuration; and when the user equipment enters an RRC idle state, configuring a pre-configured uplink resource for a relevant protocol layer according to the stored pre-configured uplink resource configuration.

The method according to the first aspect of the embodiments of the present disclosure further includes: when the user equipment enters an RRC connected state, deleting or retaining the relevant configuration of the pre-configured uplink resource configuration.

According to the method of the first aspect of the embodiments of the present disclosure, the deleting the relevant configuration of the pre-configured uplink resource configuration includes at least one of the following operations:

deleting the stored pre-configured uplink resource configuration; deleting the configured pre-configured uplink resource; and stopping a timer used to determine validity of the pre-configured uplink resource; the retaining the relevant configuration of the pre-configured uplink resource configuration includes at least one of the following operations: applying the pre-configured uplink resource configuration contained in the received RRC message; and restarting the running timer.

According to the method of the first aspect of the embodiments of the present disclosure, the applying the pre-configured uplink resource configuration contained in the received RRC message includes: replacing the stored pre-configured uplink resource configuration with the pre-configured uplink resource configuration contained in the received RRC message.

According to the method of the first aspect of the embodiments of the present disclosure, the method further includes: the user equipment transmitting uplink data on the configured pre-configured uplink resource; and when a lower layer of the user equipment does not receive any response information from the base station, transmitting to an upper layer of the user equipment indication information for indicating that the lower layer has not received a response to the uplink transmission on the pre-configured resource.

According to the method of the first aspect of the embodiments of the present disclosure, the lower layer includes a MAC layer and/or a physical layer, and the upper layer includes an RRC layer.

The method according to the first aspect of the embodiments of the present disclosure further includes: the upper layer performing a fallback operation, that is, using EDT to transmit the uplink data by triggering a random access procedure, or using a non-EDT conventional RRC connection establishment/recovery procedure to enter the RRC connected state to transmit the uplink data, the fallback operation including at least one of the following operations: starting or restarting a T300 timer; reestablishing a Radio Link Control (RLC) layer corresponding to a Data Radio Bearer (DRB) and/or a Signaling Radio Bearer (SRB); reestablishing a Packet Data Convergence Protocol (PDCP) layer corresponding to the DRB and/or the SRB; deleting a security key derived for performing uplink data transmission on the pre-configured uplink resource; suspending all SRBs and DRBs except SRB0; and configuring the lower layer to suspend integrity protection and encryption functions.

According to a second aspect of the embodiments of the present disclosure, provided is user equipment, including: a processor; and a memory, stored with instructions, wherein the instructions, when run by the processor, execute the method executed by user equipment according to any one of the solutions in the first aspect.

BRIEF DESCRIPTION OF THE DRAWINGS

The above and other features of the present disclosure will become more apparent with the following detailed description in conjunction with the accompanying drawings.

DETAILED DESCRIPTION

Figure 1:
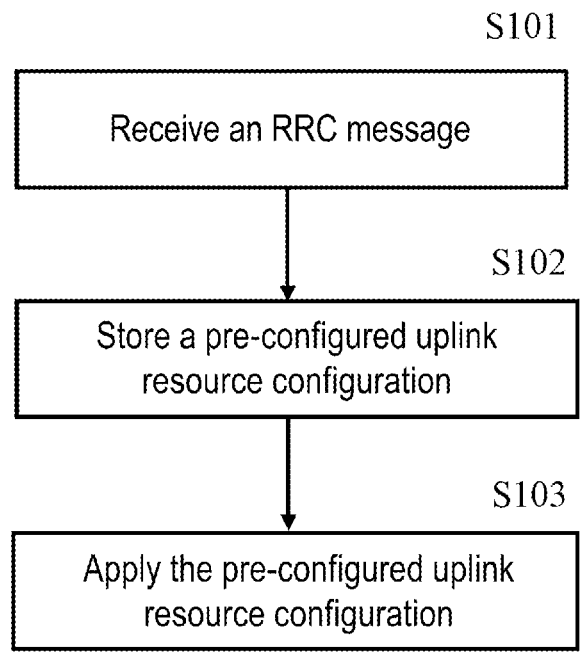
FIG. 1 is a flowchart schematically showing a method executed by user equipment in Embodiment 1 of the present disclosure.

According to the following detailed description of exemplary embodiments of the present disclosure made in conjunction with the accompanying drawings, other aspects, advantages, and prominent features of the present disclosure will become apparent to those skilled in the art.

In the present disclosure, the terms "include" and "comprise" and derivatives thereof are inclusive and not limited; the term "or" may have an inclusive meaning and means "and/or."

In the present specification, the following various embodiments for describing the principles of the present disclosure are merely illustrative, and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the accompanying drawings.

A plurality of embodiments according to the present disclosure are specifically described below by using an NB-IoT in a Long Term Evolution (LTE) mobile communication system and subsequent evolved versions thereof as an exemplary application environment. However, it should be noted that the present disclosure is not limited to the following embodiments, and may be applied to other wireless communication systems such as a machine type communication (MTC) system, and may also be applied to a 5G next-generation wireless communication system (New Radio, NR).

The base station in the present disclosure is an entity used to communicate with user equipment, which may be any type of base station, and may refer to a Node B or an Evolved Node B (eNB) or an Access Point (AP), or may be a 5G communication system base station gNB, or a micro base station, a pico base station, a macro base station, a home base station, etc. The cell may also be a cell covered by any type of base station described above. The user equipment may also refer to a terminal or an access terminal or a station or a mobile station. The user equipment may be a cellular phone or a personal digital assistant (PDA) or a cordless telephone or a notebook computer or a mobile phone or a smart phone or a handheld device or a netbook or the like.

Different embodiments can also be combined with each other for operation.

Firstly, some concepts involved in the present disclosure are described below. It is worth noting that some names in the following description are merely illustrative of examples rather than limiting, and other names may be used.

Anchor carrier: in a Frequency Division Duplex (FDD) system, the anchor carrier refers to a carrier that UE considers transmitting NB-IoT-related data, such as Physical Broadcast Channel (NPBCH), Primary Synchronization Signal (NPSS)/Secondary Synchronization Signal (NSSS), and System Information Block (SIB-NB). In a Time Division Duplex (TDD) system, the anchor carrier refers to a carrier that UE considers transmitting NB-IoT-related data, such as Physical Broadcast Channel (NPBCH), and Primary Synchronization Signal (NPSS)/Secondary Synchronization Signal (NSSS). That is, the UE receives synchronization signals, broadcast channels, and/or system information on the anchor carrier. In this disclosure, for convenience of description, unless otherwise specified, an uplink carrier corresponding to the anchor carrier is also referred to as an anchor carrier or an uplink anchor carrier. In the FDD system, the uplink carrier corresponding to the anchor carrier is generally indicated to the user by using frequency information (such as a ul-carrierfreq information element) in a system information block 2.

Non-anchor carrier: For FDD, the non-anchor carrier refers to a carrier that UE considers not transmitting NB-IoT-related data, such as NPBCH, NPSS, NSSS, and SIB-NB; for TDD, the non-anchor carrier refers to a carrier that UE considers not transmitting NB-IoT-related data, such as NPBCH, NPSS, and NSSS. That is, the UE considers that the non-anchor carrier is only used to receive or transmit NB-IoT-related unicast transmission data, such as Physical Downlink Control Channel (PDCCH), Physical Downlink Shared Channel (PDSCH), and Physical Uplink Shared Channel (PUSCH).

CarrierConfigDedicated-NB information element: This information element is used to configure a carrier in an NB-IoT system. The carrier may be an anchor carrier or a non-anchor carrier. A configuration thereof contains an uplink carrier configuration and a downlink carrier configuration. The downlink carrier configuration contains one or a plurality of frequency information, available downlink subframe information, non-anchor carrier downlink gap information, in-band carrier information, etc. of the carrier. The uplink carrier configuration contains uplink carrier frequency information and/or TDD uplink and downlink alignment offset information, etc. This information element is generally contained in a physicalconfigdedicated information element in a radioresourceconfigdedicated information element and transmitted to the UE through UE-specific RRC information such as an RRC connection reconfiguration message. The radioresourceconfigdedicated information element is used to establish/modify/release a radio bearer, modify a Medium Access Control (MAC) configuration, and modify a dedicated physical layer configuration, etc. The physicalconfigdedicated information element is used to specify a UE-specific physical channel configuration.

dl-configList information element: This information element is contained in system information, and used to configure a non-anchor carrier used for paging and random access procedures. The information element contains a non-anchor carrier configuration list.

ul-configList information element: This information element is contained in system information, and used to configure a non-anchor carrier used for a random access procedure, and contains a non-anchor carrier list.

Early Data Transmission (EDT):

The small data transmission optimization scheme in R15 further optimizes the characteristics of small data transmission from a control plane and a user plane. For uplink data transmission, the optimized content is mainly to transmit small data along with message 3 in a random access procedure. Because this optimization method can complete data transmission at an earlier moment than conventional data transmission methods, it is called early data transmission. In the present disclosure, small data (or small packet) can be equivalent to early data.

Enhanced Coverage Level: The degree to which coverage needs to be enhanced is divided into a plurality of enhanced coverage levels in the coverage enhancement technology; for example, three enhanced coverage levels are defined in NB-IoT. In MTC, four enhanced coverage levels are defined. In some enhanced coverage methods, each enhanced coverage level can correspond to a set of different wireless parameter configurations, such as a random access configuration (such as Physical Random Access Channel (PRACH) resources). When initiating random access, a medium access control layer of UE determines an enhanced coverage level of the UE according to measured RSRP and an RSRP threshold used for determining an enhanced coverage level and received in system information, and selects a corresponding random access resource (for example, a preamble) and parameter (for example, a random access response window size) according to the determined enhanced coverage level to initiate a random access process.

Physical Downlink Control Channel (PDCCH): The PDCCH may refer to a PDCCH in 3GPP LTE/LTE-A (Long Term Evolution/Long Term Evolution-Advanced) or an MPDCCH for Machine Type Communication (MTC PDCCH) or an NPDCCH for Narrowband IoT communication or an NR-PDCCH for NR (New Radio, also known as 5G), etc. The physical downlink shared channel may refer to a Physical Downlink Shared Channel (PDSCH) in 3GPP LTE/LTE-A (Long Term Evolution/Long Term Evolution-Advanced) or an NPDSCH or NR-PDSCH for narrow-band Internet of Things communication, etc.

Physical signaling/channel: The physical signaling/channel may refer to physical wake-up signaling (Wake Up Signal, WUS)/channel, or physical go-to-sleep signaling (Go-To-Sleep Signal, GTS)/channel, etc. The physical wake-up signaling/channel refers to a physical wake-up signaling/channel that needs to be detected or decoded by UE in an idle mode or UE in a Discontinuous Reception (DRX) state in an RRC connected mode before receiving or detecting or decoding a physical downlink control channel and/or a physical downlink shared channel. If the physical wake-up signaling is detected or decoded, a subsequent physical downlink control channel and/or physical downlink shared channel is received or detected or decoded. Alternatively, the physical wake-up signaling/channel refers to that UE in an idle state or UE with discontinuous reception (DRX) state in an RRC connected state, which needs to detect or decode the physical wake-up signaling/channel before receiving or detecting or decoding a physical downlink control channel and/or physical downlink shared channel. If the physical wake-up signaling/channel is detected or decoded, a subsequent physical downlink control channel and/or physical downlink shared channel is detected or decoded. If the physical wake-up signaling/channel is not detected or decoded, a subsequent physical downlink control channel and/or physical downlink shared channel is not detected or decoded. Or, the subsequent physical downlink control channel and/or physical downlink shared channel is ignored or skipped. The physical go-to-sleep signaling/channel refers to a physical go-to-sleep signaling/channel that needs to be detected or decoded by UE in an idle mode or UE in a Discontinuous Reception (DRX) state in an RRC connected mode before receiving or detecting or decoding a physical downlink control channel and/or a physical downlink shared channel. If the physical go-to-sleep signaling/channel is detected or decoded, the UE does not detect or decode a subsequent physical downlink control channel and/or physical downlink shared channel, but directly enters a sleep state. Alternatively, the physical go-to-sleep signaling/channel refers to that UE in an idle state or UE with discontinuous reception (DRX) in an RRC connected state, which needs to detect or decode the physical go-to-sleep signaling/channel before receiving or detecting or decoding a physical downlink control channel and/or physical downlink shared channel. If the physical go-to-sleep signaling/channel is detected or decoded, a subsequent physical downlink control channel and/or physical downlink shared channel is not detected or decoded. If the physical wake-up signaling is not detected or decoded, a subsequent physical downlink control channel and/or physical downlink shared channel is received or detected or decoded.

Paging Mechanism in LTE:

In the 3GPP Rel-14 standard specification, UE in an idle mode can employ discontinuous reception to reduce power consumption. A Paging Occasion (PO) is a subframe in which a PDCCH or MPDCCH or NPDCCH that uses a Paging-Radio Network Temporary Identifier (P-RNTI) for scrambling and schedules paging messages may be present. In the case of an MPDCCH scrambled by a P-RNTI, the PO refers to a starting subframe for repeated transmission of the MPDCCH. In the case of an NPDCCH scrambled by a P-RNTI, the PO refers to the starting subframe of NPDCCH repetitions unless the subframe determined by the PO is not a valid NB-IoT downlink subframe. When the subframe determined by the PO is not a valid NB-IoT downlink subframe, the first valid NB-IoT downlink subframe after the PO is the starting subframe for NPDCCH repetitions.

A paging radio frame (Paging Frame, PF) is a radio frame, which may include one or a plurality of POs. When DRX is used, the UE needs to monitor only one PO in each DRX cycle.

Paging Narrowband (PNB) is a narrowband on which UE receives a paging message.

The PF, PO, and PNB are determined by following formulae using the DRX parameters provided in system information equations:

The PF is given by the following equation:

$$\text{SFN mod } T = (T \text{ div } N) * (UE\_ID \text{ mod } N) \quad (1)$$

The PO may be obtained by looking up Table 1, Table 2, Table 3, or Table 4 using an index i_s according to a duplex mode and a system bandwidth. The i_s is obtained through the following equation:

$$i\_s = \text{floor}(UE\_ID/N) \text{ mod } Ns \quad (2)$$

For FDD:

TABLE 1

(when a PDCCH or NPDCCH is scrambled with a P-RNTI, or an MPDCCH is scrambled with a P-RNTI and system bandwidth is greater than 3 MHz)

| Ns | PO, i_s = 0 | PO, i_s = 1 | PO, i_s = 2 | PO, i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 2

(an MPDCCH is scrambled with a P-RNTI and system bandwidth is 1.4 MHz and 3 MHz)

| Ns | PO, i_s = 0 | PO, i_s = 1 | PO, i_s = 2 | PO, i_s = 3 |
|---|---|---|---|---|
| 1 | 5 | N/A | N/A | N/A |
| 2 | 5 | 5 | N/A | N/A |
| 4 | 5 | 5 | 5 | 5 |

For TDD (all uplink/downlink configurations):

TABLE 3

(when a PDCCH is scrambled with a P-RNTI, or an MPDCCH is scrambled with a P-RNTI, and system bandwidth is greater than 3 MHz)

| Ns | PO, i_s = 0 | PO, i_s = 1 | PO, i_s = 2 | PO, i_s = 3 |
|---|---|---|---|---|
| 1 | 0 | N/A | N/A | N/A |
| 2 | 0 | 5 | N/A | N/A |
| 4 | 0 | 1 | 5 | 6 |

TABLE 4

(an MPDCCH is scrambled with a P-RNTI and system bandwidth is 1.4 MHz and 3 MHz)

| Ns | PO, i_s = 0 | PO, i_s = 1 | PO, i_s = 2 | PO, i_s = 3 |
|---|---|---|---|---|
| 1 | 1 | N/A | N/A | N/A |
| 2 | 1 | 6 | N/A | N/A |
| 4 | 1 | 1 | 6 | 6 |

If the detected MPDCCH is scrambled by the P-RNTI, the paging narrowband (PNB) is determined by the following equation:

$$PNB = \text{floor}(UE\_ID/(N*Ns)) \text{ mod } Nn \quad (3)$$

If the detected NPDCCH is scrambled by the P-RNTI and the UE supports reception of a paging message on a non-anchor carrier, and configuration information of the paging message is provided for the non-anchor carrier in the system information, the paging carrier is determined by a minimum paging carrier n satisfying the following equation (4):

$$\text{floor}(UE\_ID/(N*Ns)) \text{ mod } \sum_{j=0}^{j=(max\,Paging\,Carriers-1)} Weight[j] < \quad (4)$$

$$\sum_{k=0}^{k=(n-1)} Weight[k]$$

Each time the DRX parameters in the system information change, the DRX parameters in the system information stored in the UE need to be updated locally in the UE. If the UE does not have an international mobile subscriber identity (IMSI), for example, the UE does not have a universal subscriber identity module (Universal Subsriber Identity Module, USIM) and needs to initiate an emergency call, the UE needs to use a default identity UE_ID=0 in the above PF, i_s, and PNB equations.

The following parameters are used to calculate the paging carrier for the PF, i_s, PNB, and NB-IoT:

- T: A DRX cycle of UE. Except for NB-IoT, if a high layer configures a UE-specific extended DRX value as 512 radio frames, T=512. Otherwise, T is determined by the shortest DRX cycle in a UE-specific DRX cycle (if configured by the high layer) and a default DRX cycle broadcast in the system information. If the high layer does not configure the UE-specific DRX cycle, the default DRX cycle is used. The UE-specific DRX cycle does not apply to NB-IoT.
- N: min(T, nB)
- Ns: max(1, nB/T)
- Nn: The number of paging narrowbands provided in system information
- UE_ID:
  - IMSI mod 1024, if a P-RNTI is used to scramble a PDCCH
  - IMSI mod 4096, if a P-RNTI is used to scramble an NPDCCH
  - IMSI mod 16384, if a P-RNTI is used to scramble an MPDCCH or a P-RNTI is used to scramble an NPDCCH and the UE supports reception of a paging message on a non-anchor carrier, and if configuration information of the paging message is provided for the non-anchor carrier in the system information.
- maxPagingCarriers: The number of configured paging carriers provided in system information
- Weight(i): The weight of the i-th paging carrier of NB-IoT The IMSI is a series of decimal digits (0 . . . 9). The IMSI in the equation is interpreted as a decimal integer in which the first digit is the highest-order digit, and so on. For example: IMSI=12 (digit 1=1, digit 2=2), the IMSI is interpreted as a decimal number "12" during calculation, instead of "1*16+2=18".

In the 3GPP Rel-14 standard specification, for UE in an idle mode, the paging mechanism can be employed to reduce the power consumption of the UE. When the UE has poor channel conditions and coverage enhancement is required, a PDCCH and/or PDSCH needs to be repeatedly transmitted in order to correctly receive information from a base station or correctly transmit information to the base station. When the UE needs to detect a paging message, the UE needs to be woken up from a sleep state to detect on each PO whether a paging message of the UE exists. However, the UE does not have any paging message most of the time. In this way, when the UE is in a coverage enhanced state, the UE needs to receive a PDCCH or PDSCH repeatedly many times so as to detect whether a paging message of the UE exists, and the UE does not have its own paging message most of the time. As a result, the UE power is greatly consumed. For an MTC or NB-IoT user, it is extremely important to reduce power consumption of the UE. Therefore, in the 3GPP Rel-15 standard specification, physical wake-up signaling is introduced for UE in an idle state. That is, before detection of a paging message on each PO, physical wake-up signaling is designed. If the UE detects the physical wake-up signaling, the UE detects a paging message on a subsequent PO, that is, detects a PDCCH (or MPDCCH or NPDCCH) scrambled with a P-RNTI and receives a PDSCH (or NPDCCH) scheduled by the PDCCH (or MPDCCH or NPDCCH). If the UE does not detect the physical wake-up signaling, the UE does not detect the paging message on the subsequent PO and directly returns to a sleep state.

In order to further reduce the power consumption of the UE, UE-group-based physical wake-up signaling (UE-group WUS) or physical go-to-sleep signaling can be introduced. For example, UEs corresponding to a specific PO can be divided into several groups, and a specific group or a plurality of groups of UE use one WUS. Considering backward compatibility, the newly introduced UE-group WUS or Rel-16 UE-group WUS should not affect the existence and performance of the existing Rel-15 WUS. In other words, when a system supports Rel-16 UE-group WUS, the system can support the Rel-15 WUS at the same time. In addition, considering that not all Rel-16 UE supports the UE-group WUS function, it is necessary to divide Rel-16 UE into UE supporting the UE-group WUS and UE not supporting the UE-group WUS. Therefore, in a Rel-16 system, there are three types of UE that support WUS: Rel-15 WUS UE or Legacy WUS UE (LWUS UE), UE (NGWUS UE) that does not support the UE-group WUS, and UE (GWUS UE) that supports the UE-group WUS. A solution regarding how to configure the UE group GWUS is proposed in the following embodiments of the present disclosure. By means of the method, UE group-based GWUS transmission can be implemented, so that UE can learn a GWUS configuration and can monitor GWUS associated therewith based on the UE group, so as to achieve the purpose of reducing power consumption.

Regarding the aforementioned pre-configured uplink resources, there may be two ways: one way is to use dedicated pre-configured uplink resources, that is, dedicated uplink resources are pre-allocated to UE so that uplink data transmission will not cause collisions; the other way is to use shared pre-configured uplink resources, that is, allocated uplink resources are shared by a plurality of UE, which may be a shared resource pool. In this way, the plurality of UE may use one resource for uplink transmission, which may cause conflicts due to potential contention and consequently lead to transmission failures. The conclusion reached at the recent 3GPP meeting is to support the allocation of dedicated pre-configured uplink resources for UE through RRC dedicated signaling, and whether to support the sharing of pre-configured uplink resources has not been determined. The pre-configured uplink resources are uplink resources pre-allocated to UE through an RRC message. The pre-configured uplink resources may be allocated in an RRC connected state for uplink data transmission when UE is in an RRC idle state and/or RRC connected state, or the UE may be notified through system information of the pre-configured uplink resources to be used for uplink data transmission in an RRC idle state. Although the present disclosure uses UE in an RRC idle state as a typical scenario to illustrate the following solutions, unless otherwise specified, the following embodiments of the present disclosure are also applicable to UE in an RRC connected state. For example, the carrier configuration implementation in Embodiment 1 is also applicable to a pre-configured uplink resource configuration when the UE in an RRC connected state performs uplink data transmission.

In an NB-IoT system, in a Release 13 system, UE is only supported to reside on an anchor carrier, that is, the UE initiates on the anchor carrier a random access procedure for establishing a connection to a network side or receives on the anchor carrier a paging message for downlink traffic. However, it may be supported to configure for the UE a non-anchor carrier (i.e., a carrier configured through a CarrierConfigDedicated-NB information element) through an RRC dedicated message such as an RRC connection reconfiguration message after the UE enters a connected state, so that uplink and downlink traffic of the UE can be transferred to the configured non-anchor carrier, thereby achieving a load balance between the anchor carrier and the non-anchor carrier. In a Release 14 system, the function of random access procedure and paging reception on non-anchor carriers is added. This function is achieved by carrying in system information an uplink non-anchor carrier configuration list (i.e., the aforementioned ul-configList information element) and a downlink non-anchor carrier configuration list (i.e., the aforementioned dl-configList information element). The UE may select, according to a specific rule, a non-anchor carrier from the uplink non-anchor carrier list to perform a random access procedure (see Section 5.1 in 3GPP protocol document 36.321), or may select, according to a specific rule, a non-anchor carrier from the downlink non-anchor carrier list to monitor/receive paging (see section 7 in 3GPP protocol document 36.304). For pre-configured uplink resources, in order to maximize the use of NB-IoT system resources and achieve a load balance between anchor carriers and non-anchor carriers, a solution to the issue of how to configure pre-configured uplink resources for UE on anchor carriers and non-anchor carriers is proposed in the present disclosure.

For dedicated pre-configured uplink resources, the dedicated pre-configured resources may be configured by a base station through RRC dedicated signaling, such as an RRC connection release message, an RRC connection reconfiguration message, an RRC connection establishment message, an RRC connection recovery message, and other RRC connection-related messages, when the UE is previously in an RRC connected state. The UE in an RRC idle state can use the dedicated pre-configured uplink resources to transmit uplink data. However, when the UE falls back to a conventional transmission mode, for example, when needing to enter an RRC connected state for downlink traffic transmission because the UE receives a paging message, how to deal with pre-configured uplink resources used in an idle state becomes an issue to be resolved. In addition, the fallback to the conventional transmission method may also be triggered by a transmission failure on the pre-configured uplink resources. In this case, how to implement the fallback to the conventional transmission method is also a concern of this disclosure.

In the following embodiments of the present disclosure, indicate/indication and notify/notification or inform/information can be interchanged. UE can refer to NB-IoT UE, Bandwidth-reduced Low-complexity (BL) UE, UE in enhanced coverage, or other UE such as 5G NR UE. In the present disclosure, PRACH, NPRACH, and RACH may be interchangeable. The pre-configured uplink resources may also be referred to as pre-configured uplink grants or pre-allocated uplink resources or pre-allocated uplink grants, etc. The coverage enhancement level is equivalent to enhanced coverage level, or may also be referred to as a repetition level.

Embodiment 1

FIG. 1 is a flowchart schematically showing a method executed by user equipment in Embodiment 1 of the present disclosure.

Hereinafter, the method executed by user equipment in Embodiment 1 of the present disclosure will be described in detail with reference to FIG. 1.

This embodiment proposes a method for configuring pre-configured uplink resources, which is implemented on User Equipment (UE).

As shown in FIG. 1, step S101: UE receives an RRC message containing a pre-configured uplink resource configuration. Preferably, the RRC message may be an RRC connection release message; alternatively, the RRC message may be an RRC connection-related message such as an RRC connection reconfiguration message, an RRC connection reestablishment message, an RRC connection establishment message, and an RRC connection recovery message. Several implementations of carrier information in the pre-configured uplink resource configuration are given below.

In an implementation, if the pre-configured uplink resource configuration does not contain carrier information, the UE uses an anchor carrier (that is, the UE considers that the pre-configured uplink resource is related to an anchor carrier); if carrier information in the pre-configured uplink resource configuration is set to "non-anchor carrier" or "dedicated carrier," the UE uses a carrier configured by a CarrierConfigDedicated information element in a dedicated RRC message, that is, the UE considers that the configured pre-configured uplink resource is related to a dedicated carrier configured by the CarrierConfigDedicated information element.

In an implementation, if the carrier information in the pre-configured uplink resource configuration is set to "0" or "TURE," the UE uses an anchor carrier (that is, the UE considers that the pre-configured uplink resource is related to an anchor carrier); if the carrier information in the pre-configured uplink resource configuration is set to "1" or "FALSE," the UE uses a carrier configured by a CarrierConfigDedicated information element in a dedicated RRC message, that is, the UE considers that the configured pre-configured uplink resource is related to the dedicated carrier configured by the CarrierConfigDedicated information element. In this case, the carrier information may indicate whether to use the anchor carrier for the pre-configured uplink resource. The converse is also possible. If the carrier information in the pre-configured uplink resource configuration is set to "1" or "FALSE," the UE uses an anchor carrier (that is, the UE considers that the pre-configured uplink resource is related to an anchor carrier); if the carrier information in the pre-configured uplink resource configuration is set to "0" or "TURE," the UE uses the carrier configured through the CarrierConfigDedicated information element in the dedicated RRC message, that is, the UE considers that the configured pre-configured uplink resource is related to the dedicated carrier configured by the CarrierConfigDedicated information element. In this case, the carrier information may indicate whether to use the dedicated (non-anchor) carrier for the pre-configured uplink resource.

In another implementation, the carrier information in the pre-configured uplink resource configuration contains a carrier index, which is used to indicate which carrier in system information is to be used for the pre-configured uplink resource. For an uplink carrier in the pre-configured uplink resource configuration, the carrier index of a value of "0" corresponds to uplink corresponding to an anchor carrier, that is, the anchor carrier is used for the pre-configured uplink resource, and the carrier index of a value of "1" corresponds to the first entry in the ul-configList information element; the carrier index of a value of "2" corresponds to the second entry in the ul-configList information element, and so on. For a downlink carrier in the pre-configured uplink resource configuration, the carrier index of a value of "0" corresponds to an anchor carrier, that is, the anchor carrier is used for the pre-configured uplink resource, and the carrier index of a value of "1" corresponds to the first entry in the dl-configList information element; the carrier index of a value of "2" corresponds to the second entry in the dl-configList information element, and so on. The downlink carrier in the pre-configured uplink resource may be used for downlink scheduling of data retransmission and/or for response to downlink reception of uplink data.

Step S102: The UE stores the received pre-configured uplink resource configuration.

Step S103: When the UE enters an RRC idle state (or referred to as leaving an RRC connected state, or an RRC inactive state), the UE applies the stored pre-configured uplink resource configuration. Optionally, a pre-configured uplink resource validity timer is started. The applying the stored pre-configured uplink resource configuration means configuring a related protocol layer according to the stored pre-configured uplink resource configuration. The pre-configured uplink resource validity timer is used to determine whether the pre-configured uplink resource is valid. For example, when the timer is running, the stored or configured pre-configured uplink resource is considered valid; when the timer is not running or expires, the stored or configured pre-configured uplink resource is considered invalid.

For the pre-configured uplink resource validity timer, one implementation is that the timer is a Time Alignment Timer (TAT). The TAT is used in the prior art to control how long a MAC entity considers a serving cell to be in an uplink alignment (i.e., uplink synchronization) state. That is to say, when the TAT is running, the UE MAC entity considers that a corresponding serving cell is uplink aligned, in which case the pre-configured uplink resource is valid; when the TAT is not running or expires, the UE MAC entity considers that the corresponding serving cell is not uplink aligned, in which case the pre-configured uplink resource is invalid.

Embodiment 2

Figure 2:
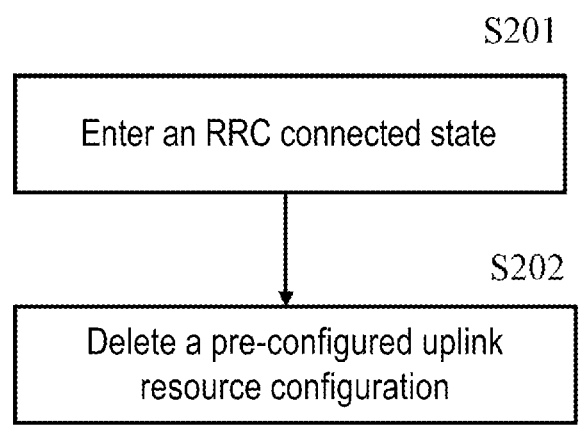
FIG. 2 is a flowchart schematically showing a method executed by user equipment in Embodiment 2 of the present disclosure.

FIG. 2 is a flowchart schematically showing a method executed by user equipment in Embodiment 2 of the present disclosure.

Hereinafter, the method executed by user equipment in Embodiment 2 of the present disclosure will be described in detail with reference to FIG. 2.

This embodiment provides a method for managing pre-configured uplink resources. In this embodiment, if UE enters an RRC connected state, the UE considers that a stored pre-configured uplink resource for an RRC idle state is useless, and the UE can delete a configuration related to the pre-configured uplink resource by itself to avoid power consumption of resource management caused by the pre-configured uplink resource related configuration when the UE is in the connected state.

As shown in FIG. 2, step S201: UE enters an RRC connected state.

The entering an RRC connected state may be that the UE receives an RRC message for instructing the UE to enter a connected state, which is preferably an RRC connection recovery message or an RRC connection establishment message.

Step S202: The UE performs one or a plurality of the following operations:

Operation 1: Release a (stored) pre-configured uplink resource configuration.

Operation 2: Release a (configured) pre-configured uplink resource.

Operation 3: Stop a timer used to determine the validity of the pre-configured uplink resource.

The "release" may also be "delete."

Embodiment 3

Figure 3:
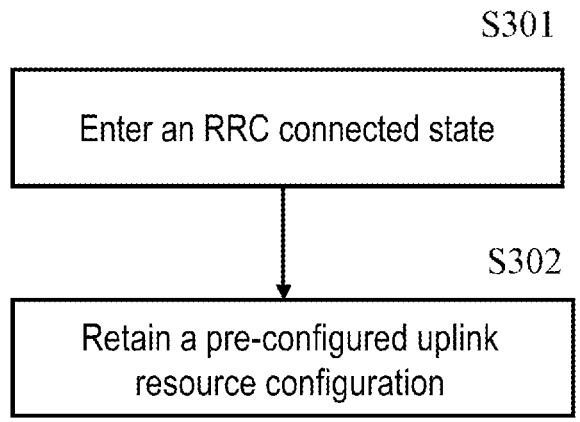
FIG. 3 is a flowchart schematically showing a method executed by user equipment in Embodiment 3 of the present disclosure.

FIG. 3 is a flowchart schematically showing a method executed by user equipment in Embodiment 3 of the present disclosure.

Hereinafter, the method executed by user equipment in Embodiment 3 of the present disclosure will be described in detail with reference to FIG. 3.

This embodiment provides another method for managing pre-configured uplink resources. In this embodiment, if UE enters an RRC connected state, the UE considers that a stored pre-configured uplink resource for an RRC idle state can be used after the UE enters the idle state again, and the UE will therefore retain a configuration related to the pre-configured uplink resource. In this way, if a network side configures the pre-configured uplink resource for the UE when the UE enters an idle state again, signaling overheads caused by the reconfiguration of the pre-configured uplink resource can be reduced or avoided.

As shown in FIG. 3, step S301: UE enters an RRC connected state.

The entering an RRC connected state may be that the UE receives an RRC message for instructing the UE to enter a connected state, which is preferably an RRC connection recovery message or an RRC connection establishment message.

Step S302: The UE performs one or a plurality of the following operations:

Operation 1: If the RRC message contains a pre-configured uplink resource configuration, the UE applies the received pre-configured uplink resource configuration. If the UE has a pre-configured uplink resource configuration stored previously, the applying the received pre-configured uplink resource configuration further includes that the UE updates the stored pre-configured uplink resource configuration, that is, replacing the stored pre-configured resource pre-configured uplink resource configuration with the pre-configured uplink resource configuration contained in the received RRC message to pre-configure an uplink resource configuration.

Operation 2: If there is a running timer for determining the validity of the pre-configured uplink resource, restart the timer for determining the validity of the pre-configured uplink resource.

Embodiment 4

Figure 4:
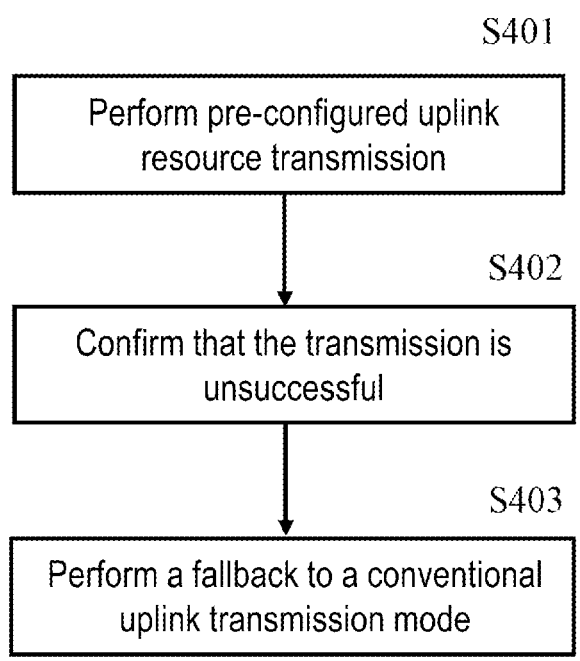
FIG. 4 is a flowchart schematically showing a method executed by user equipment in Embodiment 4 of the present disclosure.

FIG. 4 is a flowchart schematically showing a method executed by user equipment in Embodiment 4 of the present disclosure.

Hereinafter, the method executed by user equipment in Embodiment 4 of the present disclosure will be described in detail with reference to FIG. 4.

Generally speaking, UE configured with a pre-configured uplink resource will use the corresponding pre-configured uplink resource to transmit uplink data. However, in some cases, for example, if the UE does not have a valid TA, or the amount of uplink data to be transmitted is large, the UE will choose to fall back to a conventional uplink transmission method, that is, entering an RRC connected state to transmit the uplink data by triggering a random access procedure to use EDT to transmit uplink data or use a non-EDT conventional RRC connection establishment/recovery procedure.

This embodiment provides a method in which UE configured with a pre-configured uplink resource fails to transmit data on the pre-configured uplink resource and therefore falls back to a conventional uplink transmission mode, which is implemented on UE in an RRC idle state.

As shown in FIG. 4, step S401: A lower layer of UE performs pre-configured uplink resource transmission, that is, the UE uses a pre-configured uplink resource to transmit uplink data. The lower layer refers to a MAC layer and/or a physical layer.

Before step S401, the method may also include that an RRC layer determines to use the pre-configured uplink resource to transmit the uplink data, and instructs the lower layer to use the pre-configured uplink resource to transmit the uplink data.

Step S402: If the lower layer has not received any response information from a base station, for example, an indication for confirming whether the uplink transmission in step S401 is a successful reception or a failed reception, the lower layer transmits indication information to the upper layer (RRC layer) for indicating to the upper layer that the lower layer has not received a response to the pre-configured resource uplink transmission, or indicating to the upper layer that the pre-configured resource uplink transmission of the lower layer has failed, and the indication information may also be interpreted as an instruction to request the upper layer to fall back to conventional uplink transmission.

The determination that the lower layer has not received any response from the base station may be determination based on a certain time duration, for example, no response has been received within a time duration after transmission of the uplink data, or the UE has not received any response after performing a certain number of retransmissions of the uplink data. Optionally, the response may be a response indicating successful reception.

Optionally, this step further includes that the MAC layer flushes a MAC layer-related buffer, which may be a message 3 buffer or a Hybrid Automatic Repeat Request (HARQ) buffer.

Step S403: After receiving the indication in step S402 from the lower layer, the RRC layer performs an operation of falling back to the conventional uplink transmission mode. The operation may include one or a plurality of the following:

Operation 1: Start or restart a T300 timer.

Operation 2: Reestablish a Radio Link Control (RLC) layer corresponding to a Data Radio Bearer (DRB) and/or a Signaling Radio Bearer (SRB).

Operation 3: Reestablish a Packet Data Convergence Protocol (PDCP) layer corresponding to the DRB and/or the SRB.

Operation 4: Delete a security key derived for performing uplink data transmission on the pre-configured uplink resource.

Operation 5: Suspend all SRBs and DRBs, excluding SRB0 herein.

Operation 6: Configure the lower layer to suspend integrity protection and encryption functions.

Embodiment 5

Figure 5:
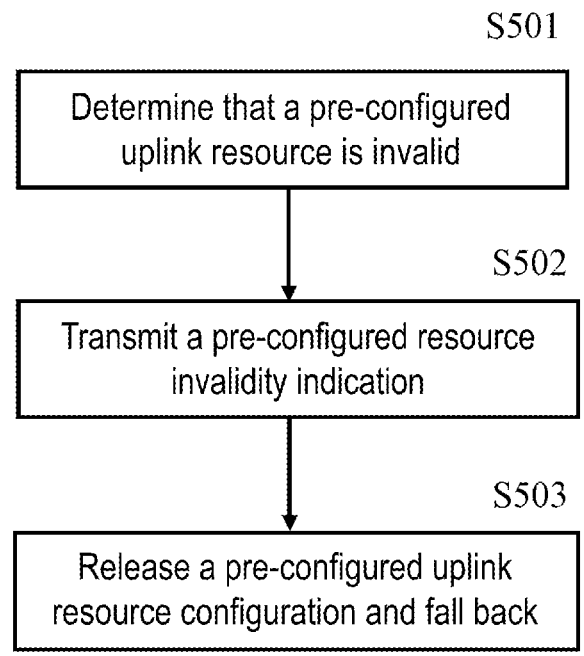
FIG. 5 is a flowchart schematically showing a method executed by user equipment in Embodiment 5 of the present disclosure.

FIG. 5 is a flowchart schematically showing a method executed by user equipment in Embodiment 5 of the present disclosure.

Hereinafter, the method executed by user equipment in Embodiment 5 of the present disclosure will be described in detail with reference to FIG. 5.

For the use of pre-configured uplink resources, one implementation is that when there is uplink data to be transmitted (for example, based on a request from a NAS layer), an RRC layer determines whether to use a pre-configured uplink resource transmission mode or a conventional uplink data transmission mode. In some cases, whether the pre-configured uplink resources are valid is determined by the RRC layer, for example, based on whether a serving cell has changed, and in some other cases, it is determined by a MAC layer, for example, based on whether the aforementioned TAT has expired. In such cases, information exchange between the MAC layer and the RRC layer is required to complete the entire determination of whether to use the pre-configured uplink resource transmission mode. This embodiment provides a solution to the information exchange between layers.

As shown in FIG. 5, step S501: A MAC entity of UE determines that a pre-configured uplink resource is invalid. The determination may be based on a pre-configured uplink resource validity timer or a TAT, or may be based on a transmission failure on the pre-configured resource, or may be based on downlink channel quality such as RSRP exceeding a configured threshold.

Step S502: When the MAC entity of the UE determines that the pre-configured uplink resource is invalid, the MAC layer of the UE transmits a pre-configured uplink resource invalidity indication to an RRC layer of the UE, that is, indicates to the RRC layer that the pre-configured uplink resource is invalid. Optionally, the indication may also indicate a specific reason for invalidity, such as the pre-configured uplink resource validity timer expires or the TAT expires.

Step S503: The RRC layer that receives the indication from the MAC layer can release a pre-configured uplink resource configuration.

Step S503 is optional, that is, the RRC layer may also choose not to release the pre-configured uplink resource configuration after receiving the indication, but directly fall back to a conventional uplink data transmitting mode. In this implementation mode, when the RRC layer determines whether to use the pre-configured uplink resource transmission mode, the determination needs to be based on whether the pre-configured uplink resource (configuration) is valid, that is, the pre-configured uplink resource transmission mode can only be used when there is a valid pre-configured uplink resource.

In this way, according to the description of the foregoing embodiments, the present disclosure provides a method executed by user equipment that can resolve the issues of configuration and management of pre-configured uplink resources.

Variant Embodiment

Figure 6:
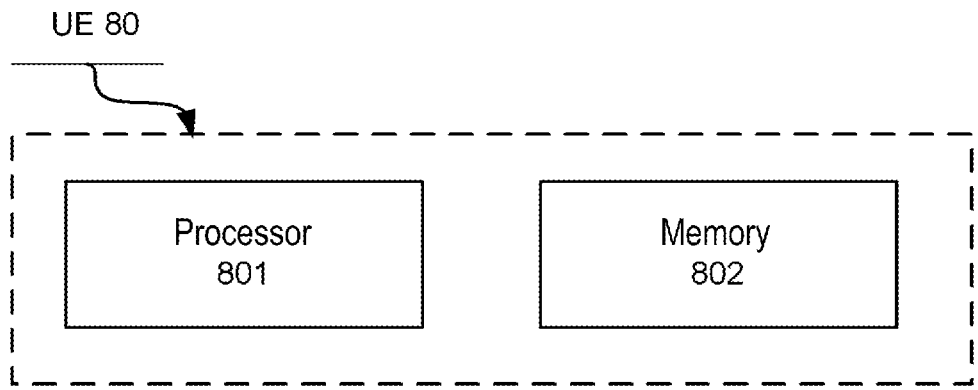
FIG. 6 is a block diagram schematically showing user equipment involved in the present disclosure.

Hereinafter, FIG. 6 is used to illustrate user equipment that can execute the method executed by user equipment described in detail above in the present disclosure as a variant embodiment.

FIG. 6 is a block diagram schematically showing user equipment involved in the present disclosure.

As shown in FIG. 6, User Equipment (UE) 80 includes a processor 801 and a memory 802. The processor 801 may include, for example, a microprocessor, a microcontroller, an embedded processor, etc. The memory 802 may include, for example, a volatile memory (such as a Random Access Memory (RAM)), a Hard Disk Drive (HDD), a non-volatile memory (such as a flash memory), or other memories. The memory 802 stores program instructions. The instructions, when executed by the processor 801, can perform the aforementioned method performed by the user equipment as described in detail in the present invention.

Embodiment 6

This embodiment provides a method for configuring a UE group-based physical wake-up signal, which can be implemented on UE or a base station or a system including the UE and the base station. Through this method, the UE and the base station can receive or transmit a WUS based on configured group-based WUS, so as to reduce power consumption of the UE and use the least WUS resources to achieve the purpose of reducing the power consumption of the UE.

The method includes: dividing GWUS UE corresponding to a specific PO into several UE groups, and assigning a WUS to each group or a plurality of groups of UE. For example, UE-group supporting WUS UE corresponding to a specific PO is divided into four groups: G1, G2, G3, and G4. If one GWUS is allocated to each group of UE, four WUSs are required: GWUS1, GWUS2, GWUS3, and GWUS4, corresponding to G1, G2, G3, and G4, respectively. Alternatively, the four groups of UE can be combined, in a total of 15 combinations: G1, G2, G3, G4, G1+G2, G1+G3, G1+G4, G2+G3, G2+G4, G3+G4, G1+G2+G3, G1+G2+G4, G1+G3+G4, G2+G3+G4, and G1+G2+G3+G4. One GWUS can be allocated to each combination, and 15 GWUS are required. Alternatively, several combinations can be selected, and one GWUS can be allocated to each of the selected combinations. For example, 11 combinations, G1, G2, G3, G4, G1+G2, G1+G3, G1+G4, G2+G3, G2+G4, G3+G4, and G1+G2+G3+G4, are selected, and 11 GWUSs, GWUS1, GWUS2, . . . , GWUS10, and GWUS11, are allocated to the 11 combinations, respectively. When the UE of G1 has a paging message, a base station transmits GWUS1; when the UE of G1 and G2 has a paging message, the base station transmits GWUS5; when the UE of G1, G2, G3, and G4 has a paging message, the base station transmits GWUS11. Alternatively, one GWUS is allocated to each of G1, G2, G3, and G4, and one GWUS (also referred to as a common CWUS) is separately allocated to G1+G2+G3+G4. In this case, five GWUSs are required. Alternatively, a Common WUS (CWUS) can be configured through system information or UE-specific RRC signaling or MAC signaling or physical layer signaling, and the CWUS may be configured as a LWUS or a newly defined WUS.

UE that does not support UE-group WUS in Rel-16 can be configured as LWUS UE, or a WUS configured for UE that does not support UE-group WUS in Rel-16 is an LWUS, that is, UE that does not support UE-group WUS in Rel-16 uses an LWUS to operate. Alternatively, a newly defined WUS can be configured for UE that does not support UE-group WUS in Rel-16.

Alternatively, for UE supporting UE-group WUS in Rel-16, a specific group or a plurality of groups of UE in several groups may be configured as UE that uses an LWUS, or a WUS configured for a specific group or a plurality of groups of UE in several groups of UE supporting UE-group WUS in Rel-16 is an LWUS, that is, the specific group or plurality of groups of UE in several groups of UE supporting UE-group WUS in Rel-16 use an LWUS to operate.

Multiplexing between LWUS and GWUS and between GWUS and GWUS may be Time Division Multiplexing (TDM), Frequency Division Multiplexing (FDM), Code Division Multiplexing (CDM), FDM+TDM, FDM+CDM, TDM+CDM, or FDM+TDM+CDM. The multiplexing mode between LWUS and GWUS may be different from the multiplexing mode between GWUS and GWUS. For example, TDM is used between LWUS and GWUS, and CDM is used between GWUS and GWUS. Alternatively, FDM is used between LWUS and GWUS, and CDM or FDM+CDM is used between GWUS and GWUS. Alternatively, the multiplexing mode between LWUS and GWUS and the multiplexing mode between GWUS and GWUS employ the same multiplexing mode, for example, the same multiplexing mode of CDM or one of the foregoing possible multiplexing modes is employed.

The base station can configure the multiplexing mode between LWUS and GWUS according to an operating environment of the base station (for example, the number of UE the base station serves, etc.). Alternatively, the base station configures the multiplexing mode between LWUS and GWUS and/or the multiplexing mode between GWUS and GWUS separately or collectively according to the number of UE groups supported or other possible parameters.

FDM is multiplexing based on one or a plurality of Physical Resource Blocks (PRBs) as a unit. Alternatively, FDM is multiplexing based on one or a plurality of subcarriers as a unit.

TDM is multiplexing based on one or a plurality of Orthogonal Frequency Division Multiplexing (OFDM) symbols as a unit. Alternatively, TDM is multiplexing based on one or a plurality of subframes as a unit. Alternatively, TDM is multiplexing based on one or a plurality of radio frames as a unit. Alternatively, TDM is multiplexing based on one or a plurality of Discontinuous Reception (DRX) cycles as a unit. Alternatively, TDM is multiplexed based on one or a plurality of Enhanced Discontinuous Reception (eDRX) cycles as a unit.

CDM is multiplexing based on different basic sequences. Alternatively, the CDM is multiplexing based on different cover codes of the same basic sequence. The cover codes can be a frequency domain cover code or a time domain cover code. For example, there are 12 subcarriers in one PRB, and 12 orthogonal cover codes can be generated; alternatively, the cover codes are generated based on OFDM symbols in the time domain. When the CDM mode is employed, there are two transmission modes: only one code (basic sequence or cover code) is transmitted at a specific moment, and a plurality of codes (basic sequences or cover codes) are transmitted at a specific moment.

In one implementation, the UE determines which group the UE belongs to based on a UE identifier. The UE and the base station need to learn configuration information of a plurality of UE groups and UE group-based GWUSs before they can monitor/transmit, based on a UE group, a GWUS associated with the corresponding group. Associations between a plurality of combinations of UE groups and a plurality of GWUSs are given below, but it is worth noting that the manners in which UE learns the associations between the plurality of combinations of UE groups and the plurality of GWUSs in the present disclosure is not limited to the two implementations described below.

In an implementation, the configuration information of the GWUSs contains a GWUS list, and each item in the list corresponds to one GWUS, that is, contains a resource configuration of one GWUS. The resource configuration may be time domain resources, frequency domain resources, code domain resources, and/or space domain resources. In addition, the GWUS configuration information also contains information about the number of UE groups and/or a bitmap. The information about the number of UE groups is used to indicate the number of UE groups; the bitmap is used to indicate whether each of the plurality of combinations based on the UE groups is associated with a GWUS in the GWUS list. When the number of UE groups is N, the length of the bitmap is $(C_N^1+C_N^2+ \ldots +C_N^{N-1}+C_N^N)$ bits. A maximum possible number of combinations between the N UE groups is also $(C_N^1+C_N^2+ \ldots +C_N^{N-1}+C_N^N)$ (i.e., G1, G2, ..., GN, G1+G2, G1+G3, ..., G1+GN, G2+G3, G2+G4, ..., G2+GN, G3+G4, G3+GN, ..., GM+G(M+1), ..., GM+GN, G(N−1)+GN, G1+G2+G3, G1+G2+G4, ..., G1+G2+GN, G1+G3+G4, G1+G2+ ... +GN), so that each bit in the bitmap corresponds to a combination of UE groups or a GWUS corresponding to the combination. For a specific bit, if the value of the bit is set to 1, a GWUS associated with a UE group combination corresponding to the bit is contained in the GWUS list; if the value of the bit is set to 0, the GWUS associated with the corresponding UE group combination corresponding to the bit is not contained in the GWUS list, that is, the GWUS associated with the UE group combination is not configured. For example, if the number of UE groups is four groups G1 to G4, then each group has 15 combinations at most, i.e., G1, G2, G3, G4, G1+G2, G1+G3, G1+G4, G2+G3, G2+G4, G3+G4, G1+G2+G3, G1+G2+G4, G1+G3+G4, G2+G3+G4, and G1+G2+G3+G4. In this case, the length of the bitmap is 15, and each bit corresponds to one of the above 15 combinations. For example, bit 1 corresponds to G1, bit 2 corresponds to G2, bit 3 corresponds to G3, bit 4 corresponds to G4, and bit 5 corresponds to G1+G2, and so on, and bit 15 corresponds to G1+G2+G3+G4. The one-to-one correspondences between the arrangement order of the bits of the bitmap and the various combinations of UE groups need to be specified in advance or configured in signaling (for example, when the number of groups is one, the GWUS list contains only a configuration of one GWUS1; when the number of groups is two, bit 1 to bit 3 in an order in which each bit in the bitmap corresponds to the group combination sequentially correspond to group combinations G1, G2, and G1+G2; when the number of groups is three, bit 1 to bit 7 in an order in which each bit in the bitmap corresponds to the group combination sequentially correspond to group combinations G1, G2, G3, G1+G2, G1+G3, G2+G3, and G1+G2+G3; when the number of groups is four, the correspondence is as described in the previous examples, and will not be repeated herein). However, the network side does not necessarily configure an associated GWUS for all the 15 combinations. In this example, the network side configures associated GWUSs for 11 of the 15 combinations, and the corresponding GWUS configuration is included in the GWUS list in the GWUS configuration, that is, the GWUS list contains 11 items GWUS1 to GWUS11. In this case, which of the 15 combinations is configured with an associated GWUS is indicated by bit values in the bitmap. If the value of the bitmap is 111111111100001, it means that GWUSs corresponding to 11 combinations, G1, G2, G3, G4, G1+G2, G1+G3, G1+G4, G2+G3, G2+G4, G3+G4, and G1+G2+G3+G4, are configured, while the four combinations of G1+G2+G3, G1+G2+G4, G1+G3+G4, and G2+G3+G4 are not configured with GWUSs. The number of items with the bit set to 1 in the bitmap is consistent with the number of GWUS items in the GWUS list, and the order of the items with the bit set to 1 in the bitmap is consistent with the order of the GWUS items in the GWUS list, that is, the first low bit (or high or leftmost or rightmost bit) with a value of 1 in the bitmap corresponds to the first item in the GWUS list, and the second low bit (or high or leftmost or rightmost bit) with a value of 1 in the bitmap corresponds to the second item in the GWUS list, and so on. In the above manner, the configured correspondence relationship between the plurality of GWUSs and combinations of UE groups can be learned from the bitmap and the correspondence relationship between the bitmap and the combinations of UE groups. In the above example, GWUS1 to GWUS11 sequentially correspond to the 11 combinations of G1, G2, G3, G4, G1+G2, G1+G3, G1+G4, G2+G3, G2+G4, G3+G4, and G1+G2+G3+G4, respectively.

In another implementation, in addition to the information about the GWUS column and/or the number of UE groups contained in the GWUS configuration, each GWUS contains one piece of group (combination) information, and the group (combination) information is used to indicate an association relationship between the GWUS and a UE group or a combination of UE groups corresponding to the GWUS. The association relationship between a plurality of GWUSs and a plurality of UE groups or combinations of UE groups is configured in such a way of displaying. In the above example, the GWUS configuration list in the GWUS configuration information contains 11 GWUS items, corresponding to 11 GWUSs, namely GWUS1 to GWUS11. A configuration of each GWUS contains associated group (combination) information thereof. For example, group (combination) information contained in configuration information of GWUS1 is indicated as G1, group (combination) information contained in configuration information of GWUS2 is indicated as G2, group (combination) information contained in configuration information of GWUS3 is indicated as G3, group (combination) information contained in the configuration information of GWUS4 is indicated as G4, group (combination) information contained in configuration information of GWUS5 is indicated as G1+G2, and so on. In one implementation, the group (combination) information is a bitmap, the length of the bitmap is the length of the number of groups, and the order of bits of the bitmap from low to high (or from high to low or from left to right or from right to left) is consistent with the order of group numbers of UE group combinations from small to large (or from large to small). For example, for GWUS5 (i.e., the fifth item in the GWUS list), the group (combination) information thereof is indicated as 1100; for GWUS6 (i.e., the sixth item in the GWUS list), the group (combination) information thereof is indicated as 1010.

After learning the correspondence relationship or association relationship between each GWUS and UE group combination in the GWUS list, the UE monitors a GWUS associated with or corresponding to a group based on its own group, and does not need to monitor GWUSs unassociated with the group of the UE, so as to reduce the power of the UE. Still in the above example, the number of UE groups is four, and the UE determines its group as group 2 or G2 through information such as a UE identifier and a formula. When the GWUS1 to GWUS11 corresponding to the 11 combinations of G1, G2, G3, G4, G1+G2, G1+G3, G1+G4, G2+G3, G2+G4, G3+G4, G1+G2+G3+G4 are configured on the network side, the UE monitors the GWUS, i.e., GWUS2\GWUS5\GWUS8\GWUS9\GWUS11, corresponding to its own group 2, i.e., G2, without monitoring or without the need to monitor GWUS1\GWUS3\GWUS4\GWUS6\GWUS7\GWUS10.

In yet another implementation, the GWUS associated with the UE is configured through dedicated signaling, that is, the UE needs to monitor all GWUSs configured through dedicated signaling.

In yet another implementation, the GWUS associated with the UE is configured through dedicated signaling. In this way, the network side issues, through system information, all GWUSs used by the cell, i.e., included in a GWUS list. The GWUSs configured through the dedicated signaling of the UE contain a bitmap, and the length of the bitmap is consistent with the number of GWUSs (or the number of items in the GWUS list). Each bit in the bitmap corresponds to one GWUS. If the corresponding bit in the bitmap is set to 1, the UE monitors the GWUS corresponding to the bit. If the corresponding bit in the bitmap is set to 0, the UE does not or does not need to monitor the GWUS corresponding to the bit. The order of the bits in the bitmap is consistent with the order of the corresponding GWUSs in the GWUS list.

In yet another implementation, the GWUS configuration information includes the GWUS corresponding to each UE group. The order of GWUSs in the GWUS configuration list corresponds one to one to the order of the group numbers of the UE groups from small to large (or from large to small). If the number of UE groups is N, the first item in the GWUS list corresponds to group 1 in the UE groups, i.e., G1, the second item in the GWUS list corresponds to group 2 in the UE groups, i.e., G2, and so on, and the Nth item in the GWUS list corresponds to group N in the UE groups, i.e., GN.

The configurations mentioned above can be implemented through system information or UE-specific RRC signaling or MAC signaling or physical layer signaling.

The methods and related devices according to the present disclosure have been described above in conjunction with preferred embodiments. It should be understood by those skilled in the art that the methods shown above are only exemplary, and the above-described embodiments can be combined with one another as long as no contradiction arises The method of the present invention is not limited to steps or sequences illustrated above. The user equipment shown above may include more modules, for example, may also include modules that can be developed or developed in the future and can be used for base stations, MMEs, or UE, and so on. Various identifiers shown above are only exemplary, not for limitation, and the present disclosure is not limited to specific information elements serving as examples of these identifiers. Those skilled in the art can make various alterations and modifications according to the teachings of the illustrated embodiments.

It should be understood that the above embodiments of the present disclosure may be implemented through software, hardware, or a combination of software and hardware. For example, various components of the base station and user equipment in the above embodiments can be implemented by multiple devices, and these devices include, but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In the present application, the term "base station" may refer to a mobile communication data and control switching center with large transmit power and a wide coverage area, and has functions of resource distribution scheduling, data receiving and transmitting, and the like. The term "user equipment" refers to a user mobile terminal, for example, a terminal device capable of performing wireless communication with a base station or a micro base station, including a mobile phone, a notebook computer and the like.

The program running on the device according to the present disclosure may be a program that enables a computer to implement the functions of the embodiments of the present disclosure by controlling a central processing unit (CPU). The program or information processed by the program can be stored temporarily in a volatile memory (e.g., Random Access Memory (RAM)), a Hard Disk Drive (HDD), a non-volatile memory (e.g., flash memory), or other memory systems.

The program for implementing the functions of the embodiments of the present disclosure may be recorded on a computer-readable recording medium. The corresponding functions can be achieved by reading programs recorded on the recording medium and executing these programs by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the foregoing embodiments may be implemented or executed by circuits (e.g., monolithic or multi-chip integrated circuits). Circuits designed to execute the functions described in this description may include general-purpose processors, Digital Signal Processors (DSPs), Application Specific Integrated Circuits (ASICs), Field Programmable Gate Arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices mounted indoors or outdoors, such as AV equipment, kitchen equipment, cleaning equipment, air conditioner, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications may be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A User Equipment (UE) comprising:
one or more processors; and
at least one memory, wherein the at least one memory stores instructions that, when executed by the one or more processors, cause the one or more processors to:
cause a Radio Resource Control (RRC) layer to determine, using a pre-configured uplink resource, to transmit uplink data in an RRC idle state without performing a random access procedure;
cause a Medium Access Control (MAC) layer to transmit the uplink data to a base station using the preconfigured uplink resource; and
cause the MAC layer to determine and indicate to the RRC layer that the transmission of the uplink data on the preconfigured uplink resource has failed in response to determining that a response for the transmission of the uplink data has not been received from the base station during a time duration, wherein
when the UE receives an RRC connection release message containing a configuration of the pre-configured uplink resource, a pre-configured uplink resource validity timer is started, and
the RRC layer determines, using the pre-configured uplink resource, to transmit the uplink data in the RRC idle state without performing the random access procedure when (i) the pre-configured uplink resource validity timer is running and (ii) a reference signal received power (RSRP) does not exceed a configured threshold.

2. A control method in a User Equipment (UE) comprising:
causing a Radio Resource Control (RRC) layer to determine, using a pre-configured uplink resource, to transmit uplink data in an RRC idle state without performing a random access procedure;
causing a Medium Access Control (MAC) layer to transmit the uplink data to a base station using the preconfigured uplink resource; and
causing the MAC layer to determine and indicate to the RRC layer that the transmission of the uplink data on the preconfigured uplink resource has failed in response to determining that a response for the transmission of the uplink data has not been received from the base station during a time duration, wherein
when the UE receives an RRC connection release message containing a configuration of the pre-configured uplink resource, a pre-configured uplink resource validity timer is started, and
the RRC layer determines, using the pre-configured uplink resource, to transmit the uplink data in the RRC idle state without performing the random access procedure when (i) the pre-configured uplink resource validity timer is running and (ii) a reference signal received power (RSRP) does not exceed a configured threshold.

* * * * *